United States Patent [19]

Ketterling et al.

[11] 4,178,757
[45] Dec. 18, 1979

[54] FLOW CONTROL MEANS

[75] Inventors: Edwin Ketterling, Libertyville; Benjamin R. Nelson, Lindenhurst, both of Ill.

[73] Assignee: White Farm Equipment Company, Eastlake, Ohio

[21] Appl. No.: 823,469

[22] Filed: Aug. 10, 1977

[51] Int. Cl.² .............................................. B60T 13/12
[52] U.S. Cl. ........................................ 60/548; 60/550; 60/566; 60/581
[58] Field of Search ................. 60/547, 548, 550, 566, 60/562, 553, 560, 581, 582, 589

[56] References Cited

U.S. PATENT DOCUMENTS

| | | | |
|---|---|---|---|
| 2,848,877 | 8/1958 | Stelzer | 60/566 |
| 2,887,187 | 5/1959 | Fletcher | 60/550 |
| 3,799,300 | 3/1974 | Cochrane | 60/547 |
| 4,086,770 | 5/1978 | Shaw | 60/562 |
| 4,087,972 | 5/1978 | Scheffel | 60/550 |

FOREIGN PATENT DOCUMENTS

| | | | |
|---|---|---|---|
| 1261400 | 2/1968 | Fed. Rep. of Germany | 60/548 |
| 384678 | 12/1932 | United Kingdom | 60/547 |

*Primary Examiner*—Abraham Hershkovitz
*Attorney, Agent, or Firm*—Lockwood, Dewey, Alex & Cummings

[57] ABSTRACT

For the hydraulic brake system of a vehicle such as a farm or industrial tractor having brakes on the right and left rear wheels for both braking and steering, flow control means operatively interconnecting a source of hydraulic pressure available when the vehicle is operating, a hydraulic fluid reservoir and a manually actuated brake applicator means such as a brake pedal, so as to provide power braking. The flow control means also provides for manual braking when hydraulic pressure is not available. A separate relatively large fill piston and small pressurizing piston used in manual braking are in combination with the power brake valve. An unloading valve is provided for cooperation with the fill piston during both the power and manual modes.

4 Claims, 5 Drawing Figures

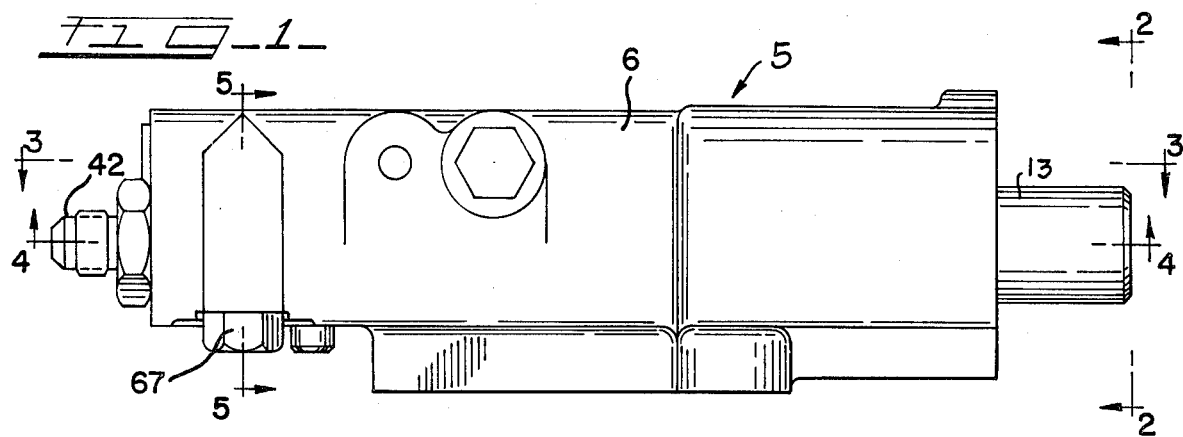
FIG_1
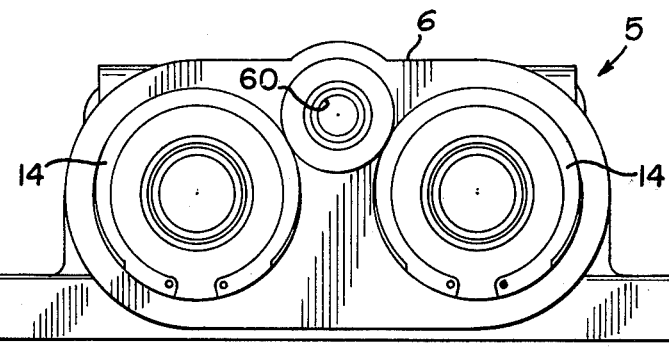
FIG_2
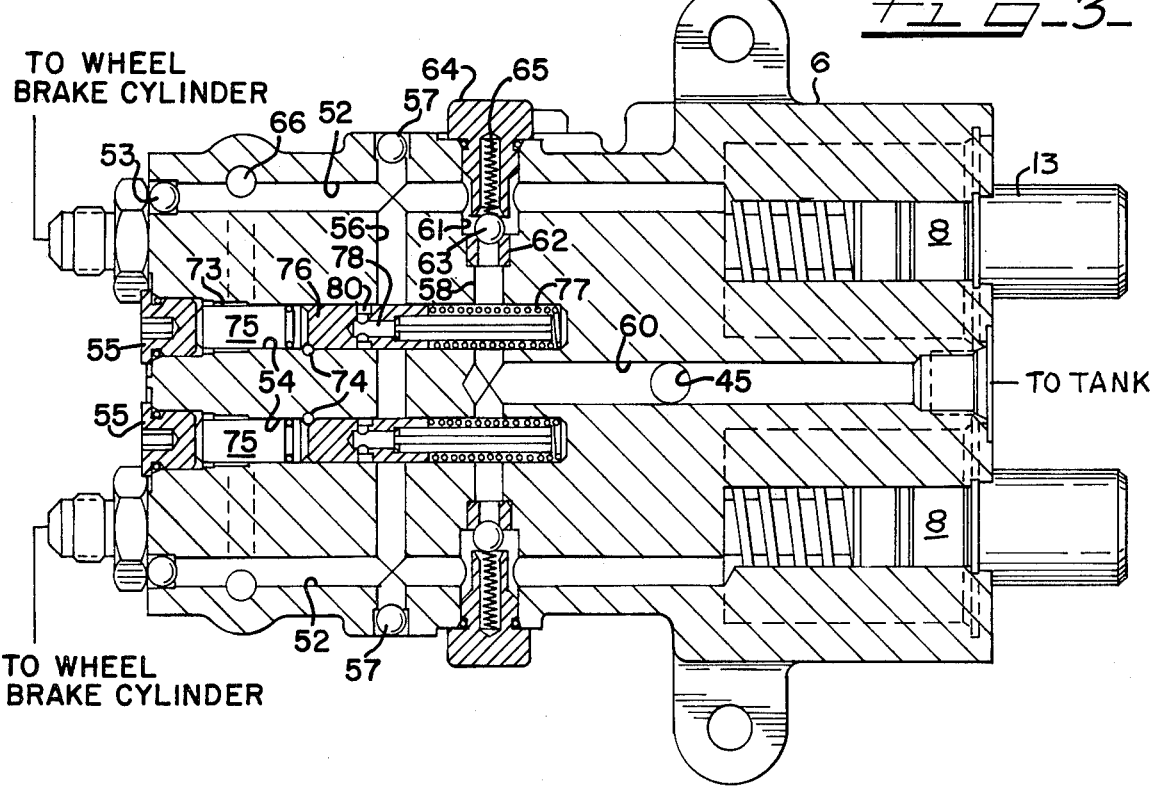
FIG_3

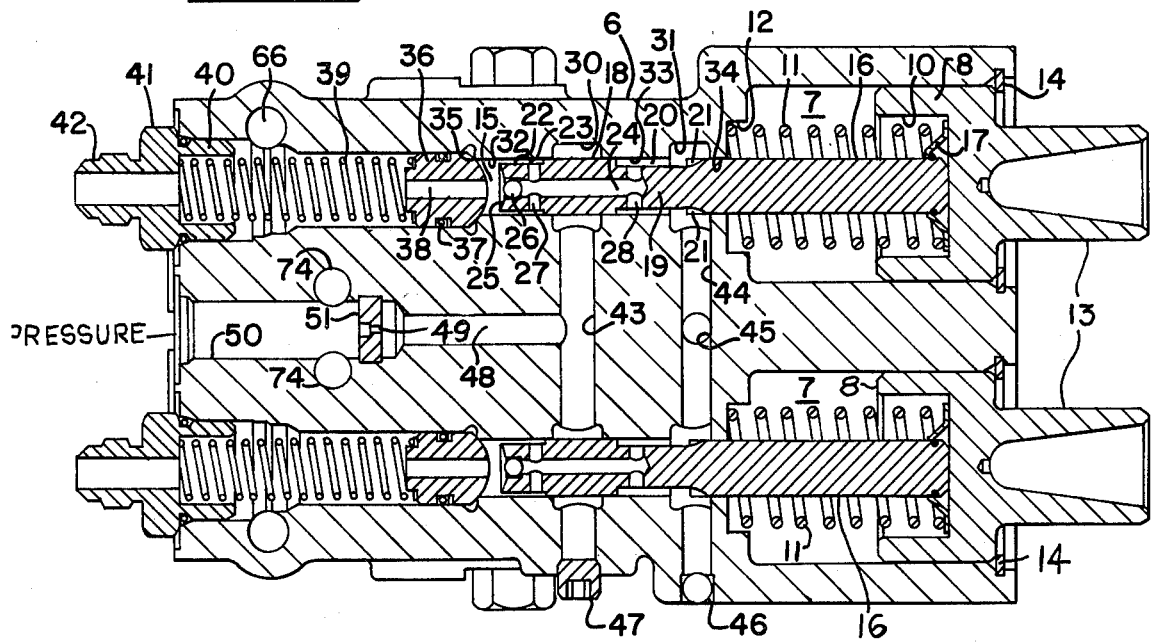
FIG_4_
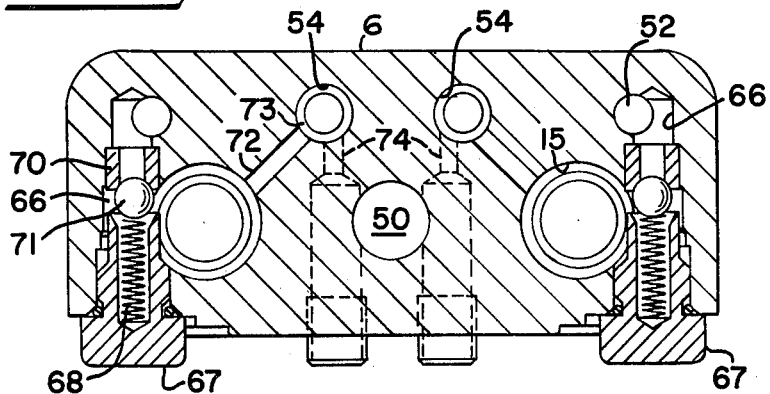
FIG_5_

FLOW CONTROL MEANS

This invention relates generally to innovations and improvements in flow control means for use in braking the rear wheels of farm and industrial tractors, the braking action being used to brake and/or steer such tractors.

Farm and industrial tractors are conventionally equipped with hydraulic systems that perform various functions such as power-braking, power-steering and operating various attachments such as front end loaders, back hoes, etc. For obvious safety reasons, there is a requirement for such tractors to be equipped with manually operated brakes which can be relied on when adequate hydraulic system pressure is not available such as when the tractor engine is stopped or stalled or some disabling malfunction occurs in the hydraulic system. There are S.A.E. (Society of Automotive Engineers) specifications for manual brakes and braking systems for tractors. Such specifications include the maximum force that has to be applied to a brake pedal and the maximum braking distance within which the tractor must be brought to a stop from a specified speed with the manual brakes. These specifications are quite difficult to achieve manually in brake systems that operate normally at pressures of approximately 2000 psi.

The object of the invention is the provision of a new and improved flow control means for power braking, and in case of power failure, manually braking the rear wheels of farm and industrial tractors characterized by: being capable of meeting S.A.E. specifications and other applicable safety requirements; being economical to manufacture and maintain; being safe and reliable in operation; being capable of providing single stroke manual braking; and producing pressure feedback to the brake pedal proportional to the braking force.

The foregoing and certain other objects will be apparent from the following description of a presently preferred embodiment of the invention taken in connection with the accompanying drawings wherein:

FIG. 1 is a side elevational view of a hydraulic flow control unit forming one embodiment of the invention;

FIG. 2 is an elevational view of the unit shown in FIG. 1 taken from the right hand side thereof;

FIG. 3 is a longitudinal horizontal sectional view taken generally on line 3—3 of FIG. 1;

FIG. 4 is a longitudinal horizontal sectional view taken generally on line 4—4 of FIG. 1; and FIG. 5 is a vertical sectional view taken on line 5—5 of FIG. 1.

In the drawings, a flow control device or unit is indicated generally at 5 which is adapted to be mounted in an appropriate location on a vehicle such as a large farm tractor equipped with a hydraulic system, which, for example, produces a normal hydraulic operating pressure in a range of 1500–2250 psi. The unit 5 is preferably made with a single body that advantageously takes the form of a casting which by subsequent manufacturing operations of known type is provided with suitable chambers, passageways and ports. The unit 5 is symmetrical on opposite sides of a longitudinal vertical plane, one half being operatively connected with the brake actuator for one rear wheel of the associated vehicle and the other half being operatively connected with the other rear wheel.

In the right hand end of the casting or body 6 of the unit 5 are a pair of chambers 7—7 (FIG. 4) for receiving manually (i.e., foot pedal actuated) actuated pistons 8—8. Each of the pistons 8 is provided with a spring-receiving recess 10 on its inner end of receiving in seated relationship therein one end of a pedal-return spring 11 the opposite end of which is seated in a recess 12 formed on the inner end of each chamber 7. Each piston 8 has an outwardly projecting stem 13 by which the piston may be mechanically connected in known manner with the appropriate brake pedal for actuation thereby. Each of the pistons 8 is retained in its respective chamber 7 by a snap ring 14 with each spring 11 being strong enough to retract its piston 8 into engagement with its stop ring 14 when the associated brake pedal is released.

Longitudinally extending bores 15—15 (FIG. 4 and 5) are formed in the casting body 6 which are coaxial with the chambers 7 and which open at their inner or right-hand ends into the chambers 7 and which at their outlet or left-hand ends open to ports in the left-hand end of the casting 6. In the right-hand portions of the bores 15 valve spools 16—16 are operative. The right-hand portions of the spools 16 are of uniform diameter and of such length that the right-hand ends of the spools will engage the pistons 8 in the recess 10 when the pistons are in their fully retracted positions, as shown in FIG. 4. Preferably, a flanged conical retainer washer 17 is trapped on the right-hand end of each valve spool 16.

The left-hand or inner end portion of each valve spool 16 is machined so as to provide a cylindrical section 18 which fits with close tolerance within the right-hand portion of the bore 15. Each spool 16 is also provided with a reduced diameter or necked section 19 extending between the cylindrical section 18 and the right-hand end portion of the spool 16 so as to provide an annular recess 20. A pair of diametrically opposed metering notches 21—21 are formed in each spool 16 opening into the associated annular recess 20 at the right-hand end thereof (FIG. 4).

The left-hand end of each spool 16 also has a reduced diameter or necked section 22 so as to provide a small clearance 23 with the interior of the bore 15.

Each valve spool 16 is provided with a coaxial passageway 24 extending inwardly from its left-hand end and the left-hand end of each spool is machined so as to be concaved as indicated at 25. A ball 26 is press-fitted into the left-hand end of each passageway 24 so as to permanently seal the left-hand end of each passageway. The left-hand portion of each valve spool 16 is provided adjacent the left-hand end of the section 18 with a transverse passageway 27 communicating between the coaxial passageway 24 and the space 23, and adjacent the right-hand end of the section 18 with a transverse passageway 28 communicating between the inner end of the passageway 24 and the annular recess 20.

Each longitudinal bore 15 is provided with a chamber or enlargement 30 and another chamber or enlargement 31. The formation of the chambers 30 and 31 serves to provide the right-hand portion of the bore 15 with a left-hand land 32, an intermediate land 33, and a relatively narrow right-hand land 34. The lands 32, 33 cooperate with opposite ends of the spool section 18 and the land 34 cooperates with the right-hand end of the spool 16.

The left-hand portion of each bore 15 is somewhat larger than the right-hand portion whereby annular shoulder seats 35 are formed which provide seats for the right-hand convex ends of free pistons 36 preferably formed of a suitable plastic material such as Delrin or nylon. Each of the free pistons 36 is provided with a circumferential groove in the center portion for receiving an O-ring seal 37 and has a reduced diameter left end which serves to provide a centering retainer for the inner end of a spring 39 located in the left portion of each bore 15. Each piston 36 is provided with a coaxial passageway 38 communicating between opposite ends thereof.

The left-hand end of each bore 15 is counterbored and tapped so as to receive the threaded inner end 40 of an adapter fitting 41 having an outwardly extending nipple 42. Each of the threaded portions 40 is hollow so as to provide a socket for receiving the left-hand end of the associated spring 39.

A transverse passageway 43 is formed in the casting 6 which interconnects the chambers 30—30 of the bores 15. The chambers 31—31 are also interconnected by a horizontal passageway 44. A vertical passageway 45 (FIGS. 3 & 4) extends upwardly from passageway 44 and connects with a longitudinal horizontal passageway 60 (FIG. 3) which in turn connects with the tank or reservoir of the hydraulic system. The outer end of passageway 44 is closed by another press-fitted ball 46. The outer end of the passageway 43 is closed by a plug 47. A longitudinal passageway 48 connects at its inner end with the transverse passageway 43 and its outer end opens into a bore 50 of larger diameter which serves as a chamber for receiving a cylindrical plug 51 provided with a small metering orifice 49. The port at the outer end of the chamber 50 is adapted to be connected with the high pressure line of the tractor hydraulic system so as to receive hydraulic fluid therein typically at a normal operating pressure of between 1500-2250 psig.

Referring to FIGS. 3 and 5, in the upper portion of the casting 6 a pair of longitudinally extending passageways 52—52 are provided extending from the left end of the casting inwardly to the respective chambers 7—7. After being formed, the left-hand or outer end of each of these passageways 52 is sealed or plugged by a press-fitted ball 53. Also in the upper portion of the body 6 of the flow control unit 5 and adjacent the longitudinal center plane thereof, a pair of additional longitudinal passageways or bores 54—54 are formed. The outer ends of these bores are closed by threaded plugs 55—55. A cross bore or passageway 56 extending from one side of the casting to the other serves to interconnect each of the bores 52 with its adjacent bore 54. The outer ends of the passageway 56 are permanently plugged by press-fitted balls 57—57. An additional transverse passageway or bore 58 communicates between the longitudinal bores 52 and the bores 54 and inwardly of the latter with the inner end of the longitudinally extending passageway 60 which leads to the tank or reservoir of the hydraulic system. The outer opposite ends of the transverse passageway 58 are counterbored to provide check valve chambers 61—61 equipped with valve seat inserts 62—62, check balls 63—63, check valve plugs 64—64 and check valve springs 65—65 retained within the plugs 64.

Adjacent the left-hand ends of the longitudinal passageways 52 are vertical bores 66 (FIGS. 3 and 5) which communicate with the horizontal longitudinal passageways 52 at their upper ends, with the lower ends being provided with check valve plugs 67 carrying check valve springs 68 which are sufficiently light so that the check valves will operate at a low pressure in the order of 1½ lbs. psig. The upper end of each passageway 66 is provided with a valve seat insert 70 and a valve check ball 71 seats against the bottom of each insert 70, being normally retained in the seated position by the associated spring 68. The vertical riser or bores 66 are sufficiently large so that on the inner sides thereof they open into the side of the adjacent counterbored end of the adjacent bore 15 in the lower portion of the casting 6.

As seen in FIGS. 3 and 5, upwardly inclined passageways 72 extend between and interconnect the counterbored section of the bores 15 with longitudinally extending grooves 73 in the bores 54. The high pressure inlet chamber 50 of the casting has communication with the respective bores 54 through counterbored vertical passageways 74—74 (FIG. 5) plugged at the lower ends.

Disposed within each of the horizontal relief valve bores 54 (FIG. 3) at the outer or left-hand portion thereof is a free relief valve piston 75 and in the inner right-hand portion thereof a relief valve spool 76. The right-hand end of each spool 76 has a reduced diameter so that a compression spring 77 may be telescoped thereover with the inner end of the spring engaging the inner or blind end of the bore 54 and the left-hand end of each spring engaging against the shoulder formed on the relief valve spool. Each spring 77 normally keeps its associated valve spool 76 in its left-hand or outermost position in the bore 54 with a left-hand end thereof abutting against the inner or right-hand end of the associated piston 75 and with the piston in turn abutting against its plug 55. Each relief valve spool 76 is provided with a coaxial longitudinal passageway 78 and radially extending passageways 80 communicating therewith.

OPERATION

As mentioned above, the unit 5 has two modes of operation, one being the conventional and normal power-operated mode and the other being the manual operated mode. The design of the unit 5 is such that the two modes of operation are interfaced but without there being any interference therebetween. First to be described will be the conventional and normal power-operating mode. Hydraulic fluid under pressure is introduced into the port or chamber 50 at an operating pressure ranging between 1500-2250 psig. This operating pressure is communicated upwardly through the passageways 74 to the bore 54 so as to act on the left-hand ends of the relief valve spools 76 and force the same to their right-hand positions by overcoming the force of the springs 77. In the right-hand positions of the spools 76, the radial passageways 80 therein are in communication with their respective transverse passageways 56 each of which in turn communicates with a longitudinal passageway 52 which vents into its associated chamber 7. The radial passageways or ports 80 also communicate with the longitudinal passageways 78 in the relief valve spools 76 which in turn are in communication with the passageway 60 which leads to the reservoir or sump. Accordingly, when there is operating pressure in the inlet chamber 50, the hydraulic fluid in each chamber 7 is at sump or atmospheric pressure thereby offering no resistance to inward movement of either of the brake pistons 8.

With the brake pistons 8—8 in their inactive or retracted positions shown in FIG. 1, the valve spool sections 18 seal off the chambers 30 thereby preventing flow of fluid from the high pressure inlet port or chamber 50 through the metering orifice 49, passageway 48 and bore 43. When the operator manipulates or pushes on one of the brake pedals and thereby causes the associated brake piston 8 to move inwardly in its chamber 7, the associated valve spool 16 will be shifted to the left (as viewed in FIG. 4) and, after an introductory or preliminary movement, a point will be reached where the right-hand end of the valve spool section 18 passes beyond the left-hand end of the land 33 thereby providing an opening which allows fluid to flow into the annular recess 20. The wedge-shaped metering notches 21 on the spool 16 will have now been shifted so as to be at the right-hand end of the land 33 so as to be effective in metering flow of fluid from the annular chamber 20 to the tank or reservoir by way of passageways 44, 45 and 60. Initially, the notches 21 allow a large flow of fluid to pass therethrough. This large flow causes a high pressure drop across orifice 49. The relatively low pressure in passage 48 is transmitted through 43, 30, 20, 28, 24, 27, 22, 38 and through nipple 42 to the brake cylinder. As the valve spool 16 is moved further to the left as the result of depressing the brake pedal, the flow through the notches 21 decreases to zero when they are completely within the land 33 whereupon the full pressure will be applied to the brake cylinder. It will be noted that the fluid pressure acts on the left end of the spool 16 tending to force it to the right. The latter action results in what may be referred to as feed-back action since the operator has to overcome this feed-back pressure as well as the pressure exerted by the spring 11.

The hydraulic fluid under pressure that passes through the longitudinal passageway 38 in the piston 36 and thence out through the nipple 42 to the brake cylinder connected therewith first acts to compress the fluid and bottom the brake cylinder. Thereafter it acts to apply or set the brake with varying degrees of force depending upon the positioning of the valve spool 16.

It will be seen that when a brake pedal is released and the brake plunger 8 is returned, the associated valve spool 16 will again become centered and pressure will no longer be applied to the brakes. Each spring 39 will also cause its associated piston 36 to seat against its seat 35 in the bore 15.

In manual operation on absence of operating pressure in the chamber 50, when a brake pedal is depressed and its associated brake piston 8 moved inwardly against the force of the spring 11, fluid will be forced from the chamber 7 into the associated passageway 52 and then downwardly through the vertical passageway 66 past the ball check valve 71 which unseats from the valve seat 70 and thence into the outlet port nipple 42. At the same time the concave end surface 25 of the valve spool 16 seats and seals on the convexed end of the piston 36 and forces the piston outwardly to the left. This movement causes a portion of the oil in the bore 15 on the left side of the piston 36 to be discharged through the outlet nipple 42. After a brake piston 8 has moved inwardly from ½ to about ⅔ of its stroke, sufficient fluid will have been ejected in the foregoing manner through the associated outlet port nipple 42 and through the interconnecting line to the associated brake actuator so as to take up the slack and apply the brake. The slack having been taken up, continued application of force to the brake pedal and in turn to the brake plunger 8 now causes the pressure on the fluid in the chamber 7 and in turn the interconnecting passageways including the passageway 52 to increase substantially and this pressure is transmitted through the upwardly inclined passageway 72 to the bore 73 so as to act upon the left end of the free piston 75. This causes the piston 75 to shift to the right as viewed in FIG. 3 against the force of the spring 77. When the radial passageways 80 in the relief valve spool 76 come into registration with the transverse passageway 56, the pressure in the passageway 52, chamber 7 and connecting passageways is in effect "dumped" or relieved. However, the ball check 71 in the vertical port 66 will now seat and prevent loss of pressure that has been built up in the line between the outlet connection 42 and the brake actuator. The concave end 25 of the valve spool 16 being seated against the convex end of the piston 36 prevents the return flow of fluid through the passageway 38. Accordingly, the fluid now acting on the brake actuator is trapped preventing any release of the brake actuator as long as the brake pedal is depressed. Continued movement of the brake pedal causes further inward motion of the brake plunger 8 which movement in turn is now resisted only by the force of the spring 11 plus the reaction force exerted by the piston 36. As increased force is applied to the pedal and in turn the piston 8 and through the valve spool 16 to the piston 36, increased pressure is applied to the brake, there being no lost motion involved since all slack has been taken up and the hydraulic fluid has been fully compressed at this stage.

When the pedal for actuating a brake plunger 8 is released the associated spring 11 returns the plunger to its retracted position. On such retraction hydraulic fluid is drawn from the tank through passageways 60, 58 and 52 into the associated chamber 7. The check ball 63 unseats against its relatively weak spring 65 allowing the fluid to flow from passageway 58 into the auxiliary bore or passageway 52 and thereby refill the chamber 7.

With the system shown in the accompanying drawings, it is possible to manually apply a pressure of from 1500–2000 psi. to a brake actuator at the wheel through the manually operating system. This can be accomplished through a brake pedal movement not exceeding 8 inches. With normal power brake operation the brake pedal movement is ordinarily between 1½–2 inches.

It will be understood from the foregoing that the flow control unit 5 uses the relatively large fill pistons 8 and small pressurizing pistons 36 for manual braking only. The relief valve spools 76 and associated passageways act as an unloading valve means for the fill pistons 8 during the power mode and the final portion of the manual mode.

We claim:

1. For combination in a vehicle hydraulic brake system having right and left wheel brake cylinders, a source of hydraulic pressure when the vehicle is operating, a hydraulic fluid reservoir, and manually actuated brake applicator means, brake system actuating and control valve means for operatively interconnecting said source of hydraulic pressure, said hydraulic fluid reservoir, said manually activated brake applicator means and said wheel brake means, comprising in combination:

a valve for each of said brake cylinders adapted to be operatively interconnected therewith by conduit means and having a valve body which has, an elongated straight-through primary bore extending between first and second sides of said valve body and having at its first end adjacent said first side a chamber for receiving a manually actuated brake piston with a capacity for containing a substantial volume of hydraulic fluid, said primary bore at its opposite second end adjacent said second side having a hydraulic fluid discharge section for receiving a free piston and adapted to be interconnected by conduit means with one of said brake cylinders, and said primary bore having an interconnecting section including a pair of spaced circumferential chambers dividing said interconnecting section into lands at opposite ends thereof and an intermediate land between said circumferential chambers, one of said circumferential chambers being nearest said valve body first side and the other of said circumferential chambers being nearest said valve body second side, a first auxiliary bore paralleling said primary bore and extending from open communication at its first end with said brake piston receiving chamber to a closed second end adjacent said valve body second side, a second auxiliary bore paralleling said primary bore and closed at opposite ends and extending inwardly from adjacent said valve body second side to an inner end, a first passageway interconnecting said auxiliary bores at a location spaced substantially inwardly from said valve body second side, a second passageway interconnecting said auxiliary bores at a location spaced further from said valve body second side than said first passageway, a third passageway interconnecting said first auxiliary bore at its end adjacent said valve body second side and said hydraulic fluid discharge section of said primary bore, a fourth passageway interconnecting said second auxiliary bore at its end adjacent said valve body second side with said hydraulic fluid discharge section of said primary bore, a first fluid-return passageway for interconnecting said inner end of said second auxiliary bore with said hydraulic fluid reservoir, a second fluid-return passageway for interconnecting the circumferential chamber of said interconnecting section nearest said valve body first side with said hydraulic fluid reservoir, a pressurized fluid inlet passageway with metering orifice therein for receiving hydraulic fluid under pressure from said source thereof and interconnecting on the downstream side of said metering orifice with said circumferential chamber of said interconnecting section nearest said valve body second side, a fifth passageway interconnecting said pressurized fluid inlet passageway on the upstream side of said metering orifice with said second auxiliary bore therein at a location intermediate the connections therewith of said first and fourth passageways;

a manually actuated brake piston in said piston receiving chamber of said primary bore adapted to be operatively interconnected with said manually actuated brake applicator means of said brake system;

said free piston in said hydraulic fluid discharge section having a passage permitting fluid flow from side to side therethrough;

a first valve spool interfitting and reciprocal within said interconnecting section of said primary bore and having, an extension on a first end engageable with said brake piston for reciprocation in unison therewith, a second end opposite said first end operable in the end land of said interconnecting primary bore adjacent said hydraulic fluid discharge section, a reduced diameter section providing in one position of said valve spool communication between said spaced circumferential chambers in said interconnecting section said one position being the one said valve spool occupies when said brake system is in its brake fill stage, spaced radial passageways a first being adjacent said second end of said valve spool and providing fluid flow communication into said hydraulic fluid discharge section of said primary bore and the second opening into said reduced diameter section, a passageway interconnecting said radial passageways, said valve spool having a neutral position in said primary bore when said brake piston is in its non-actuated fully retracted position, a first actuated position wherein fluid under pressure is allowed to flow from said pressurized fluid inlet passageway through said spaced radial passageways and said interconnecting passageway into said hydraulic fluid discharge section, a second actuated position wherein said reduced diameter section provides communication between said first and second circumferential chambers, and a third actuated position wherein hydraulic fluid cannot flow into said hydraulic fluid discharge section and said second end of said valve spool acts directly on said free piston in said fluid discharge section;

a first spring-closed check valve in said third passageway unseatable to allow fluid to flow from said first auxiliary bore into said hydraulic fluid discharge section, a second spring-closed check valve in said second passageway unseatable to allow fluid to flow from said second auxiliary bore into said first auxiliary bore;

a free relief valve piston in said second auxiliary bore in the end thereof adjacent said second valve body side whereby fluid from said hydraulic fluid discharge section introduced into said second bore through said fourth passageway acts on the end of said free relief valve piston nearest said valve body second side and whereby pressurized fluid introduced into said second auxiliary bore through said fifth passageway acts on the opposite end of said free relief valve piston;

a relief valve spool reciprocable in said second auxiliary bore having a radial passageway therein communicating with a longitudinal passageway therein extending on the side of said radial passageway opposite from said free relief valve piston and into communication with said inner end of said second auxiliary bore, said relief valve spool being positionable on actuating engagement by said free relief valve piston to where said radial passageway therein communicates with said first passageway;

a first spring in said piston-receiving chamber biasing said brake piston therein towards its retracted position;

a second spring in said hydraulic fluid discharge section biasing said free piston therein toward said spool valve therein; and a third spring in said second auxiliary bore biasing said relief valve spool therein towards said free relief valve piston.

2. In the valve called for in claim 1 said first valve spool having at least one hydraulic fluid metering notch at the juncture of said extension on a first end thereof and said reduced diameter section thereof and cooperative with the end of said intermediate land nearest said valve body first side to meter hydraulic fluid flow into said circumferential chamber nearest said valve body first said when said first valve spool is in its said second actuated position.

3. In the valve called for in claim 1 the engaging ends of said first valve spool and free piston in said hydraulic fluid discharge section having mating concave and convex surfaces.

4. For combination in a vehicle hydraulic brake system having right and left wheel brake cylinders, a source of hydraulic pressure when the vehicle is operating, a hydraulic fluid reservoir, and manually actuated brake applicator means, a brake system actuating and control valve for operatively interconnecting said source of hydraulic pressure, said hydraulic fluid reservoir, said manually activated brake applicator means and said wheel brake cylinders, comprising in combination:

a valve body which is generally symmetrical in respect to two halves each of which is adapted to be operatively interconnected by conduit means with one of said brake cylinders and has, an elongated straight-through primary bore extending between first and second sides of said valve body and having at its first end adjacent said first side a chamber for receiving a manually actuated brake piston with a capacity for containing a substantial volume of hydraulic fluid, said primary bore at its opposite second end adjacent said second side having a hydraulic fluid discharge section for receiving a free piston and adapted to be interconnected by conduit means with one of said brake cylinders, and said primary bore having an intermediate interconnecting section including a pair of spaced circumferential chambers dividing said interconnecting section into lands at opposite ends thereof and an intermediate land between said circumferential chambers, a first passageway interconnecting the corresponding pair of said circumferential chambers nearest said brake fluid discharge section, a second passageway interconnecting the second corresponding pair of said circumferential chambers nearest said brake piston receiving chambers, a first auxiliary bore paralleling said primary bore and extending from open communication at a first end with said brake piston receiving chamber to a closed second end adjacent said valve body second side, a second auxiliary bore paralleling said primary bore and closed at opposite ends and extending inwardly from adjacent said valve body second side.

a third passageway interconnecting said auxiliary bores at a location spaced substantially inwardly from said valve body second side, a fourth passageway interconnecting said auxiliary bores at a location spaced further from said valve body second side than said third passageway, a fifth passageway interconnecting said first auxiliary bore at its end adjacent said valve body second side and said hydraulic fluid discharge section of said primary bore, a sixth passageway interconnecting said second auxiliary bore at its end adjacent said valve body second side with said hydraulic fluid discharge section of said primary bore, said valve body having a fluid-return passageway common to both said body halves for interconnecting the inner end of each of said second auxiliary bores and said second passageway with said fluid reservoir of said brake system, said valve body having a pressurized fluid inlet passageway common to both said body halves with metering orifice therein for receiving fluid under pressure from said source of hydraulic pressure and interconnecting on the downstream side of said metering orifice with said first passageway, and each of said body halves having a seventh passageway interconnecting said pressurized fluid inlet passageway on the upstream side of said metering orifice with said second auxiliary bore therein at a location intermediate the connections therewith of said third and sixth passageways;

a manually actuated brake piston in each of said piston-receiving chambers in said primary bores adapted to be operatively interconnected with said manually actuated brake applicator means of said brake system;

a free piston in said hydraulic fluid discharge section of each of said primary bores having an axial passage permitting fluid flow therethrough;

a first valve spool interfitting and reciprocal within said interconnecting section of each of said primary bores and having, an extension on a first end engageable with one of said brake pistons for reciprocation in unison therewith, a second end opposite said first end operable in the end land of said interconnecting primary bore section adjacent said fluid discharge section, a reduced diameter section providing communication between said spaced circumferential chambers in said interconnecting section when said first valve spool is in the position which it occupies when said brake system is in its brake fill stage, spaced radial passageways a first being adjacent said second end of said first valve spool and providing fluid flow communication into said fluid discharge section of said primary bore and the second opening into said reduced diameter section, a passageway interconnecting said radial passageways, each said first valve spool having a neutral position in its said primary bore when said brake piston therein is in its non-actuated fully retracted position, a first actuated position wherein fluid under pressure is allowed to flow from said pressurized fluid inlet passageway and said first passageway through said spaced radial passageways and said axial passageway into said fluid discharge section of said primary bore, a second actuated position wherein said reduced diameter section provides temporary communication between said first and second circumferential chambers preliminary to full braking action, and a third actuated position wherein fluid cannot flow into said fluid discharge section of said primary bore and said second end of said valve spool is acting directly on said free piston in said fluid discharge section;

a first spring-closed check valve in said fifth passageway in each of said valve body halves unseatable to allow fluid to flow from said first auxiliary bore into said hydraulic fluid discharge section of said primary bore;

a second spring-closed check valve in said fourth passageway in each of said valve body halves unseatable to allow fluid to flow from said second auxiliary bore into said first auxiliary bore;

a free relief valve piston in said second auxiliary bore in each of said valve body halves in the end of said bore adjacent said second valve body side whereby fluid from said hydraulic fluid discharge section of said primary bore introduced into said second auxiliary bore through said sixth passageway acts on the end of said free relief valve piston nearest said second side and whereby pressurized fluid introduced into said second auxiliary bore through said seventh passageway acts on the opposite end of free relief valve piston;

a relief valve spool reciprocable in said second auxiliary bore in each of said valve body halves and having a radial passageway therein communicating with an axial passage extending on the side of said radial passageway opposite from said free relief valve piston into communication with said inner end of said second auxiliary bore, said relief valve spool being positionable on actuating engagement by said free relief valve piston to where said radial passageway therein communicates with said third passageway;

a first spring in each said piston-receiving chamber of each said primary bore biasing said brake piston therein towards its retracted position;

a second spring in each said fluid discharge section of each said primary bore biasing said free piston therein towards said first spool valve therein; and a third spring in each said second auxiliary bore biasing said relief valve spool therein towards said free relief valve piston.

* * * * *